(No Model.) 2 Sheets—Sheet 2.

T. A. BECKWITH.
CAR COUPLING.

No. 475,103. Patented May 17, 1892.

Witnesses
Edwin L. Bradford
M. W. Church

Inventor
Theodore A. Beckwith
By F. R. Cornwall &
R. P. Tapley Jr.
Attorneys

UNITED STATES PATENT OFFICE.

THEODORE A. BECKWITH, OF HAVERHILL, MASSACHUSETTS, ASSIGNOR OF PART TO RUFUS P. TAPLEY, JR., CHARLES E. CLOGSTON, FRANK R. HILLIARD, GEORGE H. LEIGHTON, JOHN CALLAHAN, FRANK CALLAHAN, CLARENCE L. HOYT, ALFRED McLEOD, GAYTON C. GREELY, WILLIAM H. RUDDOCK, CHARLES M. HOYT, THOMAS J. NEAGLE, GEORGE A. TUXBURY, RANDALL B. DAY, JAMES J. VAUGHN, JAMES McDONALD, DANIEL W. HOPKINSON, MICHAEL J. KILEY, MICHAEL F. BRADY, HARGREAVES TATTERSALL, GILBERT A. SAMPSON, CHESTER F. BROWN, AND THEODORE P. DUTRA, OF SAME PLACE, JOHN J. MOLLOY, FRANK MOLLOY, MICHAEL J. SHEA, AND MILTON G. TENNEY, OF GEORGETOWN, MAURICE J. WALSH, OF LAWRENCE, AND DENNIS P. McCARTHY, OF DANVERS, MASSACHUSETTS.

CAR-COUPLING.

SPECIFICATION forming part of Letters Patent No. 475,103, dated May 17, 1892.

Application filed October 26, 1891. Serial No. 409,897. (No model.)

*To all whom it may concern:*

Be it known that I, THEODORE A. BECKWITH, a subject of the Queen of Great Britain, residing at Haverhill, in the county of Essex and State of Massachusetts, have invented certain new and useful Improvements in Car-Couplers; and I do hereby declare the following to be a full, clear, and exact description of the invention, such as will enable others skilled in the art to which it appertains to make and use the same.

My invention relates to a new and useful improvement in car-couplers, and is especially adapted to that class of couplers known as "arrow-heads."

The nature of my invention consists in providing the shell with a transverse gravitating pin loosely mounted in inclined slots, whereby upon the insertion of the arrow-head the pin will ride over the nose of the same and fall by its own gravity forward of the nose.

Another feature of the invention resides in providing the shell with a bail to disengage the pin, and also means to operate the bail from the top of the car.

Another feature of the invention consists in pivoting the shank of the draw-head in a yielding sleeve, whereby lateral movement may be obtained without undue strain upon the transverse pin and a direct line of draft continually maintained.

Another feature resides in providing the arrow-head with a strengthening-bulge in its middle, and also providing the same with openings near its ends, whereby it may be coupled with an ordinary link-and-pin coupler.

Another feature of the invention rests in providing the shell with openings in its top and bottom, whereby the same may be coupled to an ordinary link-and-pin coupler by the use of a pin in the vertical openings.

Other details of invention reside in the construction of the several parts, as hereinafter described.

Figure 1:
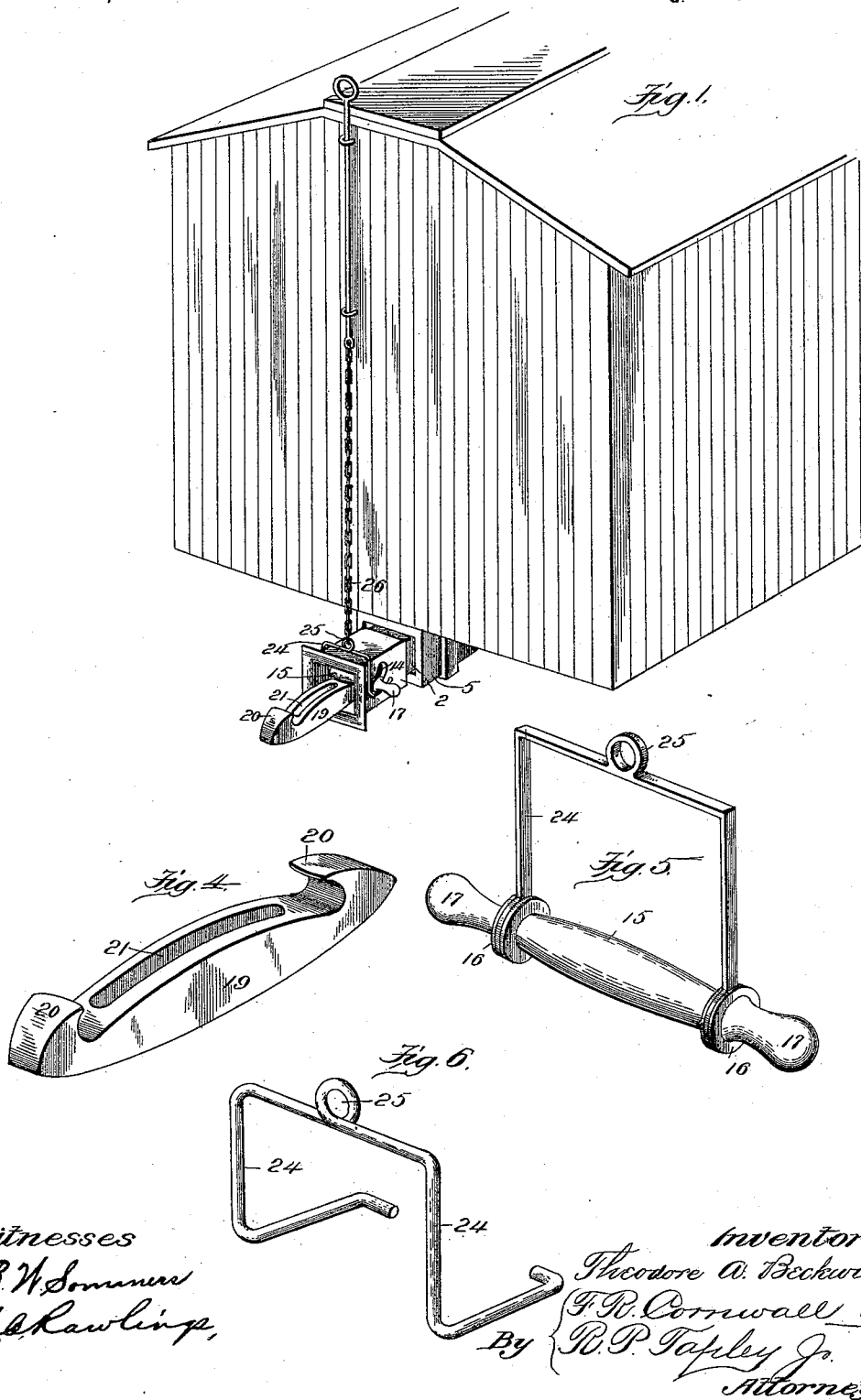
Figure 2:
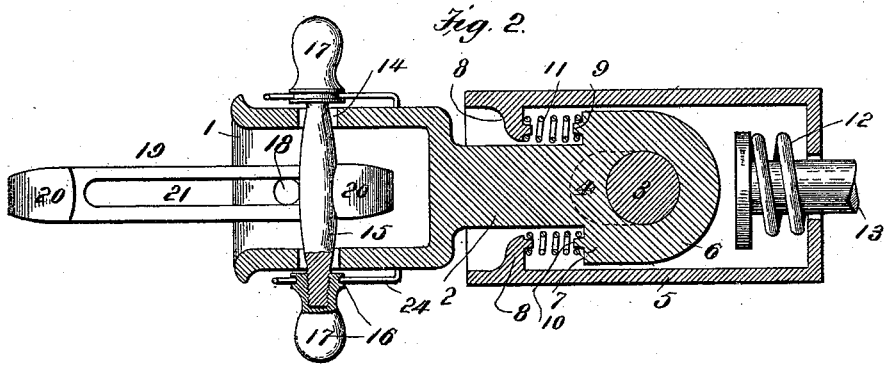
Figure 3:
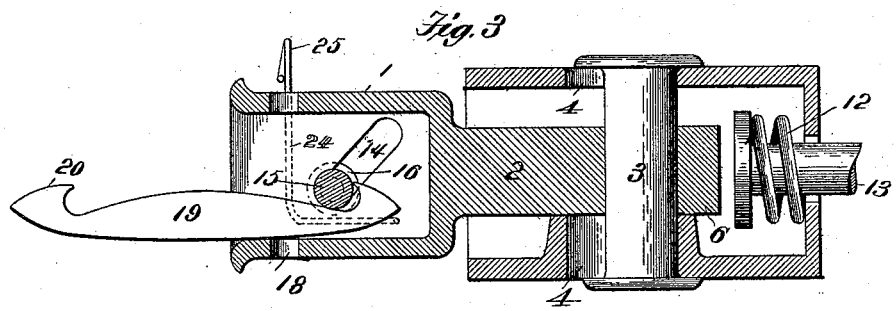
Figure 7:
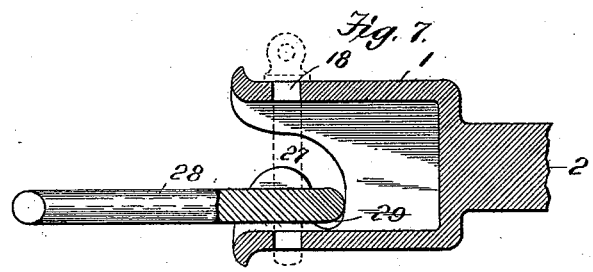
Figure 8:
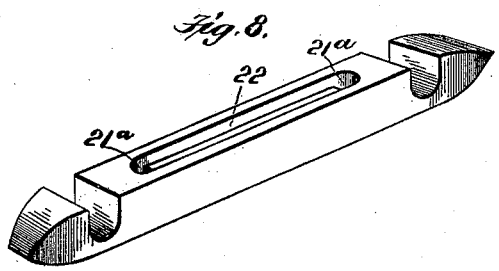

In the drawings, Figure 1 is a perspective view of the coupler attached to a car. Fig. 2 is a vertical longitudinal section through the arrow-head, shell, and shank. Fig. 3 is a horizontal section. Fig. 4 is a perspective view of the arrow-head. Fig. 5 is a perspective view of the transverse pin. Fig. 6 is a perspective view of the bail. Fig. 7 is a modification, and Fig. 8 is a perspective view of a modified form of arrow-head or link.

Referring to the drawings, wherein the same symbols of reference refer to like parts wherever they occur, 1 indicates a shell with a shank 2 at its rear, said shank being pivoted at 3 in a slot 4 in the sleeve 5. The shank 2 is provided at its rear end with an enlarged bearing 6 for the reception of the pivot 3, said bearing forming shoulders 7.

8 indicates lugs or shoulders on the inside of the sleeve 5, in advance of the shoulders 7. 9 and 10 indicate lugs on the respective shoulders. 11 indicates compression-springs interposed between the shoulders on the shank and the lugs on the sleeve, which, in conjunction with the compression-spring 12, interposed between the head of the tail-bolt 13 and rear end of the sleeve, forms a yielding connection between the draw-head and sleeve, as will hereinafter be described.

14 indicates inclined slots in the sides of the shell, in which is loosely mounted a gravitating tranversely-arranged pin 15. The pin 15 is formed convexed in longitudinal section to increase the volume of metal at the point of greatest strain and has one of its tapering ends free to permit a passage through the inclined slots and also receive one of the knobs or enlargements 16 on its free end, which knob may be secured in any suitable manner thereto, the said knobs being of greater diameter than the width of the slots, whereby they act in the capacity of guides, as well as weights, to return the pin to its normal position in the bottom of the slots.

17 indicates extensions of the knobs, which may be used as handles to raise the pin out of engagement with the nose of the arrowhead.

18 indicates openings in the top and bottom of the shell, said openings being adapted to receive an ordinary vertical pin to engage the link.

19 indicates the arrow-head, formed of a body portion bulged at its middle and tapering at each end vertically.

20 represents noses formed on the tapering ends, said noses being recessed on their inner faces to afford reception of the pin. I preferably form the surfaces of the recesses convexed to accommodate, together with the bulged middle portion of the pin 15, any slight lateral vibration, which would otherwise affect the direct line of draft.

21 indicates a slot in the body portion of the arrow-head, said slot extending to a point near the noses on the ends thereof, being a substitution for a link when the contiguous coupler is of the link-and-pin construction.

In Fig. 8 I have shown a modified form of arrow-head, wherein is represented a substantially straight body portion provided with recesses 22 in its face near its ends, said portion beyond the recesses being inclined to form entrant ends to be inserted between the transverse pin and the bottom of the shell. 21$^a$ indicates openings near the recesses, said recesses being connected at their upper ends by a channel 23, which guides the pin to the opening should the pin be in advance of the same when it is desired to couple the car, the pin of course riding on the base of the channel until it gets to the opening, when it drops in its engaged position.

Pivoted to the sides of the shell a little to the rear and below the inclined slot is a bail 24. Said bail in its normal position extends forward of the slot, at which point it is extended upward and across. A ring 25 is formed at the center of the connecting-piece of the bail above the shell. Secured to this ring is a chain or any suitable connection 26, which chain has its other end attached to the top of the car, making it only necessary to pull the chain should the operator be on top of the car, which action will elevate the bail until the angled portion at the sides of the shell come in contact with the pin, which is carried upward thereby and becomes disengaged from the arrow-head.

In Fig. 5 is shown a modified form of bail or yoke, said yoke being bent at its ends to form eyes to fit in and encircle a peripheral groove on the knob. This form, it will be observed, gives a positive movement to the pin upon the pull of the chain or rod, as the case may be, attached to the ring on the upper end of the yoke.

In Fig. 7 I have a shown a modification of the device, in which 27 represents an inclined groove on the inside of the shell, said groove adapted to receive and guide lugs on a bar 28, said lugs resting in recesses or pockets 29 in the terminus of the groove.

The operation may be described as follows: The arrow-head is first inserted under the pin, the same falling in front of the nose. To couple the car to a device of similar construction, it is only necessary that the cars be run together, when the arrow-head, being in alignment with the contiguous shell, will raise the pin and pass beneath the same, allowing the pin to fall of its own gravity in front of the nose. To uncouple, the chain or cord is pulled, which, being attached to the bail, said bail carries the pin out of engagement with the nose on the arrow-head and permits the same to be withdrawn. The pin may also be operated effectively from the ground through the medium of the handles on the knobs. Should it become necessary to couple a car provided with my device to one provided with an ordinary link-and-pin coupler and it is desired to utilize the link, the same may be secured through the medium of a vertical pin in the openings in the top and bottom of the shell; or, vice versa, if it be desired to utilize the arrow-head to couple with an ordinary drawhead the slot in the body portion of the arrowhead is used. When the car is subjected to the first strain accompanying a sudden start, the object to be accomplished is to prevent the shock from being communicated to the body portion of the car. This I overcome through the agency of the compression-springs in the sleeve. The combined resistance of the springs 11 is about equal to the resistance of the spring 12 around the tail-bolt; or it may be varied as necessity demands—viz., in cars of a given capacity the resistance of the springs 11 may be about one-half as great as the resistance of the spring 12, whereby when the strain is put on the shell 1 and shank 2 the shank is permitted a yielding forward movement through the medium of the slot 4 and springs 11. Should the resistance of the springs 11 not be sufficient to overcome the pull, the pivot-pin 3, upon reaching its limit of movement in the slot, brings into action the compression-spring 12 on the tail-bolt, thereby about equalizing the tension of both springs. It will also be observed that by connecting the chain or rod (secured to the link) with the top of the car the pivoted point of the bail and the inclined slots will accommodate a direct pull on the bail and pin should the shell and shank pull out, thus releasing the adjacent car with little damage.

Another advantage of the above-described device resides in its adaptability of being applied to the ordinary link-and-pin coupler without materially altering the present form, it being only necessary to form the inclined slots in the sides and insert the gravitating pin.

I am aware that many minor changes may be made in the construction and arrangement of the parts of my device without in the least departing from the nature and principle of my invention.

Having thus fully described my invention, what I claim, and desire to secure by Letters Patent of the United States, is—

1. In a car-coupler, the combination, with the shell provided with inclined slots, of a pin tapering at its ends, mounted in said slots, and guides on said pin outside the shell of a diameter larger than that of the slots, substantially as described.

2. In a car-coupler provided with inclined slots in its sides, a gravitating pin tapering at each end, a knob integral therewith, and a knob secured on the free end of the pin, the said knobs being of greater diameter than the width of the slot, substantially as described.

3. In a car-coupler, the combination, with a gravitating pin loosely mounted in the slots in the sides of the shell, of a bail pivoted to the shell at the rear of the slots, said bail having a horizontal portion and a vertical portion, said vertical portion being connected by cross-bar, a ring on said cross-bar, and a chain secured in said ring, whereby upon the pull of the chain the pin is carried upward through the medium of the junction of the horizontal and vertical portions of the bail, substantially as described.

4. In a car-coupler, the combination, with the shell and shank, of a sleeve and a yielding connection between the shank and sleeve and means for asserting equal pressure on both sides of the shank, whereby it is retained in position, substantially as described.

5. In a car-coupler, the combination, with the shell and shank, of an enlarged bearing in the rear of the shank, a pivot-pin passing through said bearing, and a sleeve provided with slots in which said pivot-pin plays, substantially as described.

6. In a car-coupler, the combination, with the shank, of an enlarged bearing at its rear end, a sleeve provided with internal lugs, and springs interposed between said bearing and lugs, substantially as described.

7. In a car-coupler, the combination, with the shank provided with an enlarged bearing at its rear end, of a sleeve having internal lugs in advance of the bearing, springs interposed between said lugs and bearing, and a slotted pivotal connection between said shank and sleeve, substantially as described.

8. In a car-coupler, the combination, with the shank, of a sleeve yieldingly and pivotally connected to said shank and a tail-bolt and compression-spring supported at the rear of the sleeve, substantially as described.

9. In a car-coupler, the combination, with the shell, of a yielding separable shank and a pivotal connection between the different parts of the shank, substantially as described.

10. An arrow-head for car-couplers, consisting of a slotted body portion tapering at each end and noses on the ends of said body portion, substantially as described.

11. An arrow-head for car-couplers, consisting of a slotted body portion and a nose at each end of said body portion, said nose being formed with a convexed inner bearing-surface, substantially as described.

12. In a car-coupler, the combination, with the shell, of a gravitating horizontally-disposed transversely-arranged pin loosely mounted in inclined slots in the sides of the shell, means for raising said pin, a shank extending rearwardly from the shell, a sleeve, and a pivotal and yielding connection between said sleeve and shank, substantially as described.

13. A car-coupler provided with a rearwardly-extending shank, a sleeve surrounding said shank, a pivotal and slotted connection between said shank and sleeve, and means for yieldingly retaining the sleeve in a direct line of draft, substantially as described.

In testimony whereof I affix my signature in presence of two witnesses.

THEODORE A. BECKWITH.

Witnesses:
CHARLES F. WINCH,
RICHARD A. HALL.